United States Patent
Basin

(10) Patent No.: US 8,376,326 B2
(45) Date of Patent: Feb. 19, 2013

(54) ROTATIONALLY RESTRAINED LEAF SPRING CLINCH CLIP

(75) Inventor: Oleg G. Basin, Franklin, MI (US)

(73) Assignee: GM Global Technology Operations LLC, Detroit, MI (US)

(*) Notice: Subject to any disclaimer, the term of this patent is extended or adjusted under 35 U.S.C. 154(b) by 309 days.

(21) Appl. No.: 12/748,631

(22) Filed: Mar. 29, 2010

(65) Prior Publication Data

US 2011/0233833 A1  Sep. 29, 2011

(51) Int. Cl.
B60G 11/02 (2006.01)

(52) U.S. Cl. ........... 267/37.1; 267/53; 267/36.1; 24/569

(58) Field of Classification Search .............. 267/53, 267/36.1, 37.1, 51, 52, 47, 48, 229, 260, 267/283; 280/124.17, 124.174, 124.175; 403/329, 397; 24/279, 569; 248/224.8
See application file for complete search history.

(56) References Cited

U.S. PATENT DOCUMENTS

| | | | | |
|---|---|---|---|---|
| 1,987,189 A * | 1/1935 | Geyer | | 267/53 |
| 2,192,646 A * | 3/1940 | Lindeman | | 267/53 |
| 3,703,967 A * | 11/1972 | Gessler | | 414/324 |
| 4,022,449 A * | 5/1977 | Estorff | | 267/48 |
| 4,433,833 A * | 2/1984 | Tabe et al. | | 267/218 |
| 4,455,716 A * | 6/1984 | Leonardo | | 24/115 A |
| 4,623,133 A * | 11/1986 | Davis et al. | | 267/53 |
| 5,577,750 A * | 11/1996 | Sklar | | 280/293 |
| 6,425,595 B1 * | 7/2002 | Soles et al. | | 280/124.175 |
| 6,702,082 B2 * | 3/2004 | Dorfler et al. | | 192/70.18 |
| 7,637,361 B1 * | 12/2009 | Charmat et al. | | 188/341 |

FOREIGN PATENT DOCUMENTS

JP  58037334 A  *  3/1983

OTHER PUBLICATIONS

Prior art Clinch Clips shown in operation with leaf springs, 2 pages, dated at least as early as Mar. 2008.

* cited by examiner

*Primary Examiner* — Robert A Siconolfi
*Assistant Examiner* — Mariano Sy

(57) ABSTRACT

A clinch clip for a leaf spring which is rotationally restrained in to mutually orthogonal axes. An upper clip member and a lower clip member are provided. A non-circular rivet connects a leaf of a leaf spring to the lower clip member so as to preclude mutual rotation around a rivet axis. A non-circular bolt connects together the upper and lower clip members so as to preclude rotation around a bolt axis perpendicular to the rivet axis.

12 Claims, 5 Drawing Sheets

ROTATIONALLY RESTRAINED LEAF SPRING CLINCH CLIP

TECHNICAL FIELD

The present invention relates to clinch clips used for motor vehicle leaf springs, and more particularly to a clinch clip having rotational restraint about two mutually orthogonal axes.

BACKGROUND OF THE INVENTION

Leaf springs are widely used for springably supporting the sprung mass of a motor vehicle with respect to an axle (usually the rear axle) adjacent a wheel. A leaf spring is composed of a number of stacked leaves of progressively longer length, increasing from a shortest leaf disposed adjacent the axle to a longest leaf disposed distal from the axle. The leaf spring is connected at its central portion to the axle, for example via U-bolts and a bracket. Each end of the longest leaf has an end fitting for connecting to the sprung mass. The leaf spring forms a semi-elliptical shape in which the concave shape thereof faces away from the axle.

At a generally medial location between the leaf spring central portion and each end fitting is disposed a clinch clip which serves to engird the leaves thereat so that the leaves can flex and yet be kept clinched together in a closely stacked configuration. In this regard, FIGS. 1A through 1D show an example of a prior art clinch clip 10, wherein FIG. 1A depicts a typical example of operation with respect to a leaf spring 12, an axle A and sprung mass M.

As depicted at FIG. 1C, the leaf spring 12, includes a plurality of leaves 12L, a longest 12a, a shortest 12b and, merely by example, several additional leaves 12c, 12d, 12e disposed in between.

As shown best at FIGS. 1B and 1D, the prior art clinch clip 10 is composed of an upper clip member 14 and a lower clip member 16, each having a U-shape. The upper clip member 14 has a first lateral bar 14a to which at either end thereof is integrally connected a perpendicular first leg 14b, 14c. The lower clip member 16 has a second lateral bar 16a (disposed in parallel relation to the first lateral bar 14a) to which at either end thereof is integrally connected a perpendicular second leg 16b, 16c (each disposed in parallel relation to the first legs 14b, 14c). A cylindrical rivet 18 connects the shortest leaf 12b, via a circular hole 20 formed therein, to the second lateral bar 16a, via a circular hole 22 formed therein. The upper clip member 14 is connected to the lower clip member 16 via first and second pairs of aligned circular holes 24a, 24b formed in a superposition 26 of the first and second legs, respectively, through which a cylindrical bolt 28 passes and is tightly secured thereto by a nut 30 threaded onto end threads of the bolt. A relatively large, generally U-shaped elastomeric spacer 32 is provided, having a pair of robust sidewalls 32a, 32b interconnected by a relatively thin bottom wall 32c disposed between the shortest leaf 12b and its adjacent leaf.

As can be understood from FIGS. 1C and 1D, the leaves 12L of the leaf spring 12 pass into the clinch clip 10. In this regard, the first lateral bar 14a is disposed parallel to the flat upper surface 34 of the longest leaf 12a, the second lateral bar 16a is disposed parallel to the flat of the shortest leaf 12b, and the first legs are disposed parallel to the edges 12g of the leaves. The sidewalls 32a, 32b of the spacer 32 serve to locate the first legs 14b, 14c with respect to the leaf edges 12g, as well as provide a sliding interface therebetween.

In operation, as shown at FIG. 1A, the leaf spring 12 is connected at its central portion 12f to the axle A, and each end of the longest leaf 12a is an end fitting 42a, 42b for connecting to the sprung mass M. The prior art clinch clip 10 keeps the leaves of the leaf spring 12 clinched together in a compact configuration as the axle moves in relation to the sprung mass.

Problematically, since the prior art clinch clip 10 is free to rotate around the bolt axis B (see arrow $A_B$ of FIG. 1B) and free to rotate around the (relatively perpendicular) rivet axis R (see arrow $A_R$ of FIG. 1B), when under high force and/or the spacer 32 has failed, the prior art clinch clip 10 can squeak in relation to the leaf spring, and/or the longest leaf may generate a "helicopter-like" noise relative to its adjoining leaf, and/or the prior art clinch clip 10 may rotate on either or both the bolt and rivet axes, disrupting the functionality of the leaf spring due to the undesirable load path management of the leaves during operation.

Accordingly, what remains needed in the art is a clinch clip which can somehow be rotationally restrained around the bolt and rivet axes, and yet can be configured such that the attachment of the upper and lower clip members has a compact packaging.

SUMMARY OF THE INVENTION

The present invention is a clinch clip for a leaf spring which is rotationally restrained in two mutually orthogonal (bolt and rivet) axes, and configured such that the attachment of the upper and lower clip members is compactly packaged such that underbody clearance is maximized.

The rotationally restrained clinch clip according to the present invention is composed of an upper clip member and a lower clip member, each having a U-shape, wherein the upper clip member preferably includes an offset leg end portion where it superposes, and attaches to, the lower clip member. The upper clip member has a first lateral bar to which at either end thereof is integrally connected a perpendicular first leg, each preferably having an offset leg end portion. The lower clip member has a second lateral bar (disposed in parallel relation to the first lateral bar) to which at either end thereof is integrally connected a perpendicular second leg (each being disposed in parallel relation to respectively superposed first legs).

A non-circular, preferably oval, rivet connects the shortest leaf of a leaf spring, via a correspondingly shaped non-circular hole formed therein, to the second lateral bar, via another correspondingly shaped non-circular hole formed therein. A first set of mutually aligned, non-circular, preferably rectilinear, leg holes are formed at a first superposition of one mutually abutting set of the first and second legs, respectively. A bolt having a non-circular portion corresponding to the non-circular first leg hole set is seated thereat. The bolt further passes through a second leg hole set formed in a second superposition of the other mutually abutting set of the first and second legs, respectively, and is thereupon tightly secured to the first and second legs by a nut threaded onto threads of the bolt. A pair of thin elastomeric liners are preferably provided at each first leg facing the edges of the leaves of the leaf spring which are disposed within the rotationally restrained clinch clip.

The rotationally restrained clinch clip has a significant advantage over the prior art clinch clip in that the non-circular shapes of the attachments in the bolt and rivet axes prevent the clinch clip from rotating about either of these axes, thereby eliminating noise and load path management problems associated with prior art clinch clips. An additional significant advantage is that by providing the first legs with an offset leg end portion at the above mentioned first and second superpositions, the head of the bolt and the threaded on nut are received, respectively, by the offsets (with respect to the non-offset portion of the first legs), whereby clearance is provided for any adjacent components of the underbody of the vehicle.

Accordingly, it is an object of the present invention to provide a clinch clip for a leaf spring which is rotationally restrained around the bolt and rivet axes, and compactly configured such that the attachment of the upper and lower clip members provides maximal underbody clearance.

This and additional objects, features and advantages of the present invention will become clearer from the following specification of a preferred embodiment.

DESCRIPTION OF THE PREFERRED EMBODIMENT

Figure 1A:
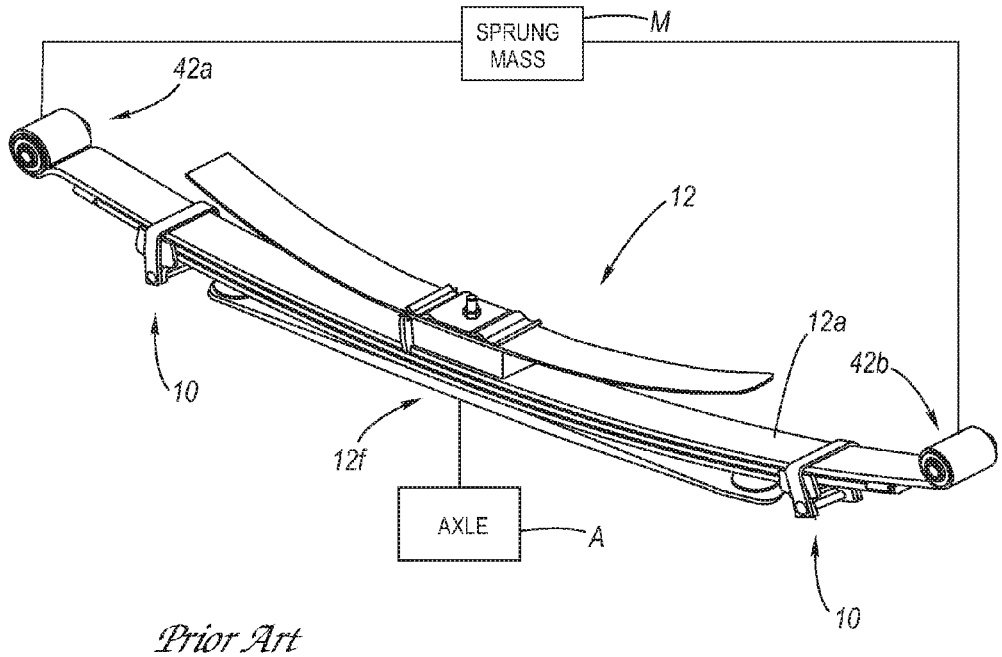
FIG. 1A is a perspective view of a conventional leaf spring schematically connected to an axle and a sprung mass, showing the location of two associated prior art clinch clips.
Figure 1B:
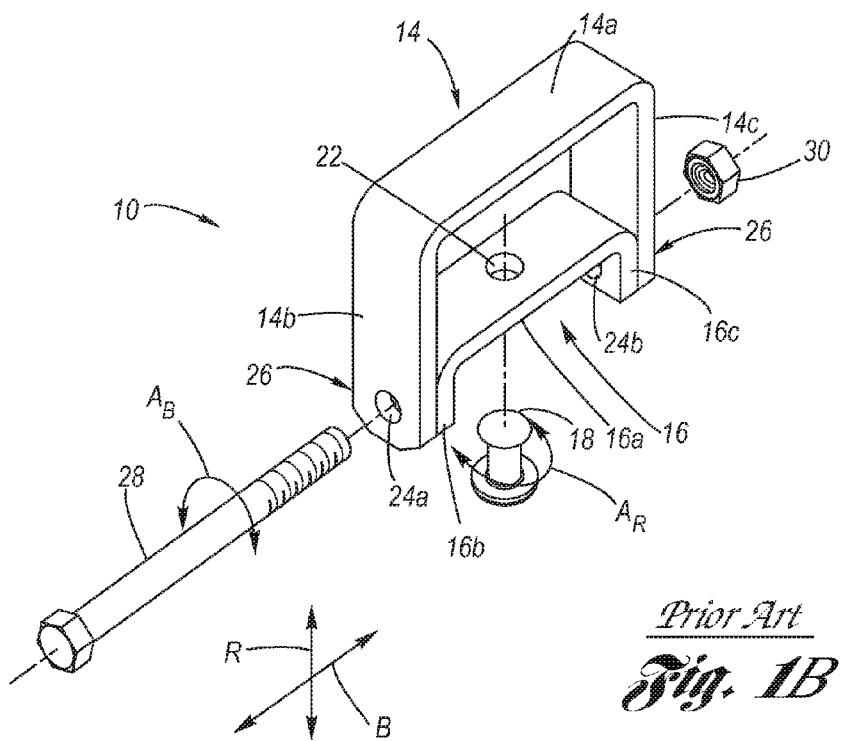
FIG. 1B is a partly exploded, perspective view of the prior art clinch clip of FIG. 1A, the spacer being removed for clarity.

Referring now to the Drawings, FIGS. 2 through 9 depict examples of a rotationally restrained clinch clip according to the present invention.

Turning attention to FIGS. 2 through 8, a preferred rotationally restrained clinch clip 100 is depicted.

Figure 1C:
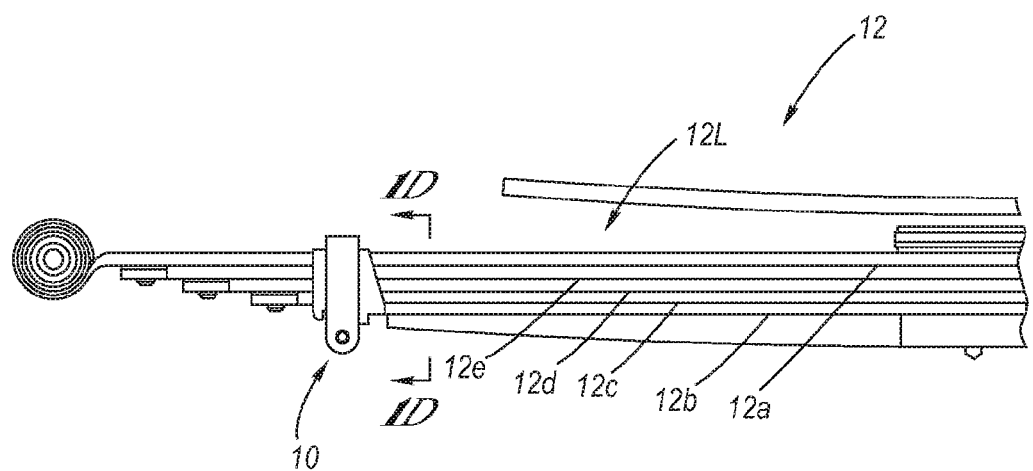
FIG. 1C is a broken-away side view of a conventional leaf spring, showing a prior art clinch clip associated therewith.
Figure 1D:
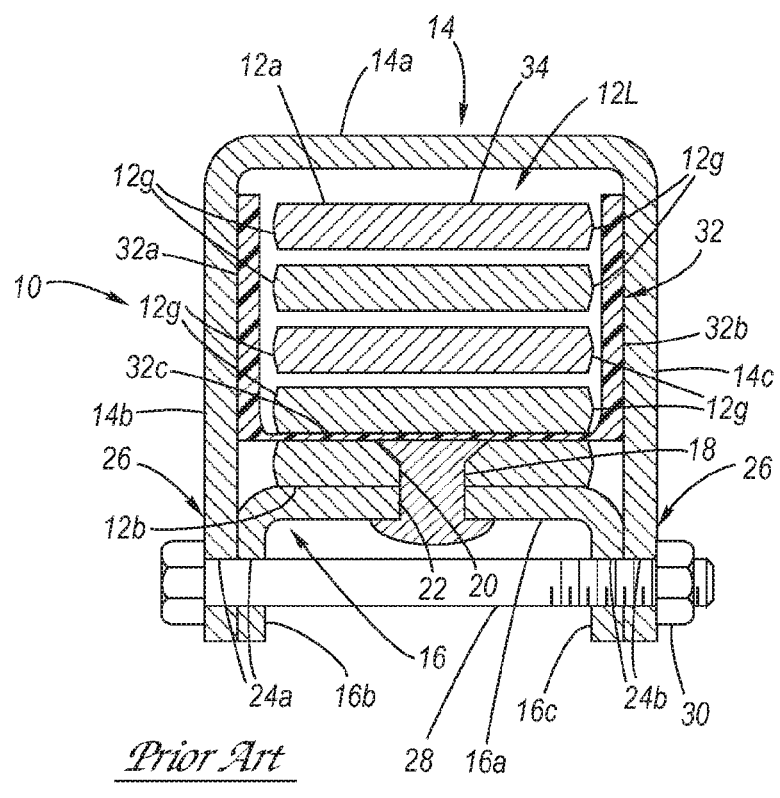
FIG. 1D is a sectional view, seen along line 1D-1D of FIG. 1C.
Figure 2:
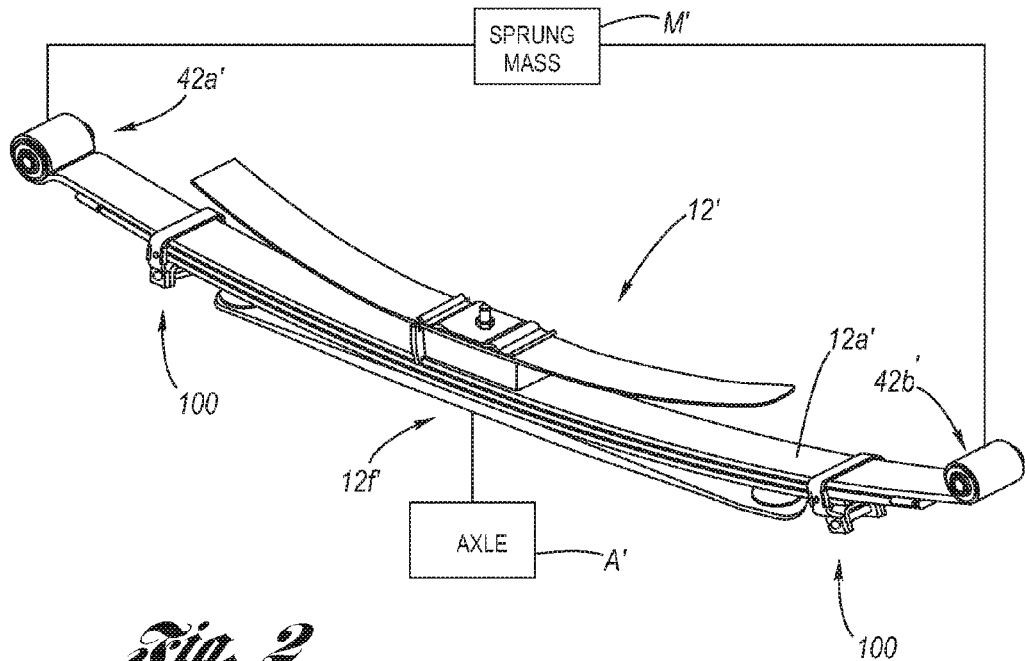
FIG. 2 is a perspective view of a leaf spring modified according to the present invention, shown schematically connected to an axle and a sprung mass, showing the location of two associated rotationally restrained clinch clips according to the present invention.
Figure 4:
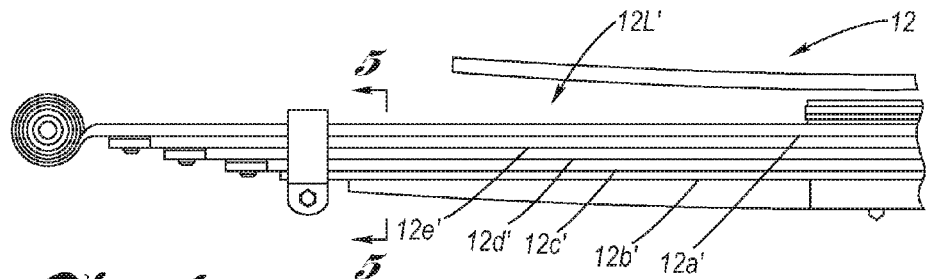
FIG. 4 is a broken-away side view of a conventional leaf spring, showing the first form of rotationally restrained clinch clip of the present invention associated therewith.

FIG. 2 depicts a pair of the rotationally restrained clinch clips 100 in operation with respect to a leaf spring 12' generally similar to that of FIG. 1A except for a non-circular hole formed in the shortest leaf, as will be described hereinbelow. As in FIG. 1A, central portion 12f' of the leaf spring 12' is connected with an axle A', and a sprung mass M' is connected to a pair of end fittings 42a', 42b' respectively at each end of the longest leaf 12a'. As depicted at FIG. 1C, FIG. 4 depicts a leaf spring 12' having a plurality of leaves 12L', including a longest 12a', a shortest 12b' and, merely by example, several additional leaves 12c', 12d', 12e' disposed in between, all of which passing into the rotationally restrained clinch clip 100.

The rotationally restrained clinch clip 100 includes an upper clip member 102 and a lower clip member 104, each having a U-shape.

The upper clip member 102 is formed of a first lateral bar 108 and a pair of first legs 110a, 110b integrally connected with the first lateral bar at each end thereof, respectively. Each first leg has an offset leg end portion 106a, 106b whereby the first leg end portions are offset in the sense of being mutually in closer spaced relation to each other than that of the non-offset portion of the first legs (i.e., the portion of the first and second legs adjoining the first lateral bar).

The lower clip member 104 has a second lateral bar 112, disposed in parallel relation to the first lateral bar 108, and a pair of second legs 114a, 114b, integrally connected with the second lateral bar at each end thereof, respectively, each disposed in parallel relation to the (mutually abutting portion of) first legs. The mutual spacing of the second legs 114a, 114b is such that they abut the first legs 110a, 110b at the inside of the respective offset leg end portion 106a, 106b at respective first and second superpositions 116a, 116b.

Figure 5:
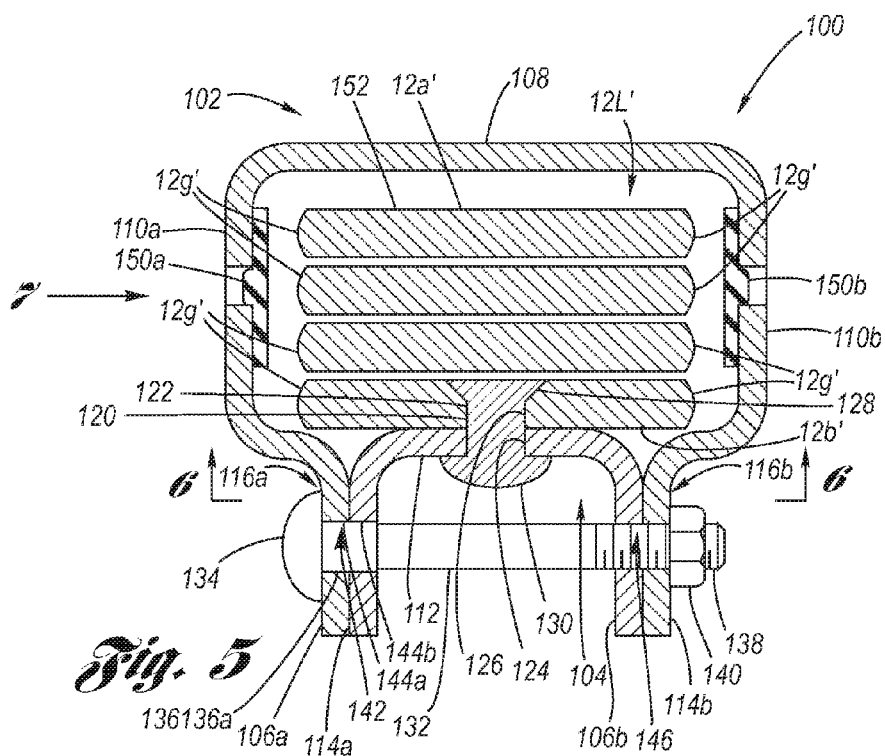
FIG. 5 sectional view, seen along line 5-5 of FIG. 4.
Figure 6:
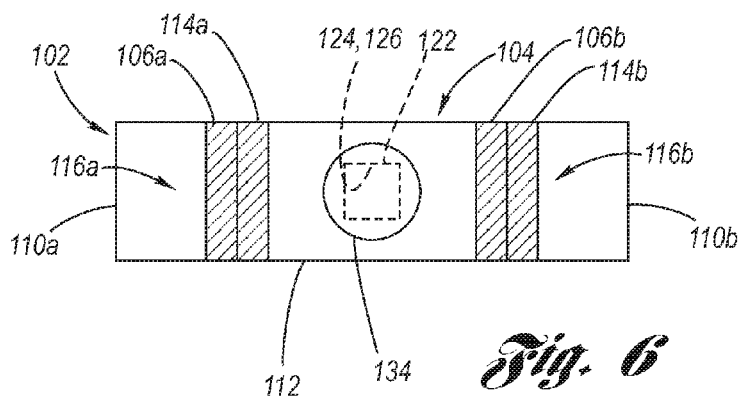
FIG. 6 is a partly sectional bottom view, seen along line 6-6 of FIG. 5, wherein the leaf spring is removed for clarity.

A rivet 120 has a shank 122 that is non-circular (that is, the shank has a non-circular cross-section), the non-circularity being for example oval (as preferably shown), rectilinear or otherwise non-circular as for example having an axial keyway or key. As shown collectively by FIGS. 3, 5 and 6, the second lateral bar 112 has a non-circular cross-sectioned bar hole 124 formed therein, the size and shape corresponding to that of the non-circular cross-section of the shank 122 such that the shank fits therethrough but cannot relatively rotate when seated therein. As shown at FIG. 5, the shortest leaf 12b' of the leaf spring leaves 12L' has a non-circular cross-sectioned leaf hole 126 formed therein, the size and shape corresponding to that of the non-circular cross-section of the shank 122 such that the shank fits therethrough but cannot relatively rotate when seated therein. The rivet 120 has, preferably, a beveled foot 128 which is countersunk into the leaf hole 126. The rivet 120 also has an oppositely disposed head 130 which is deformed in order to trap the leaf 12b' to the second lateral bar 112, wherein the cooperative noncircularity of the shank 122 with respect to the bar and leaf holes 124, 126 prevent the second lateral bar from rotating around the rivet axis R' with respect to the shortest leaf 12b'.

A bolt 132 has a bolt head 134 and adjoining non-circular bolt portion 136, in the preferred form of a bolt neck 136a, having a non-circular cross-section, the non-circularity being for example oval, rectilinear (preferred) or otherwise non-circular as for example having an axial keyway or key. The preferred bolt 132 is a carriage bolt with an elongated square cross-sectioned bolt neck (as shown). A threaded bolt portion 138 is threadable with a nut 140.

Figure 3:
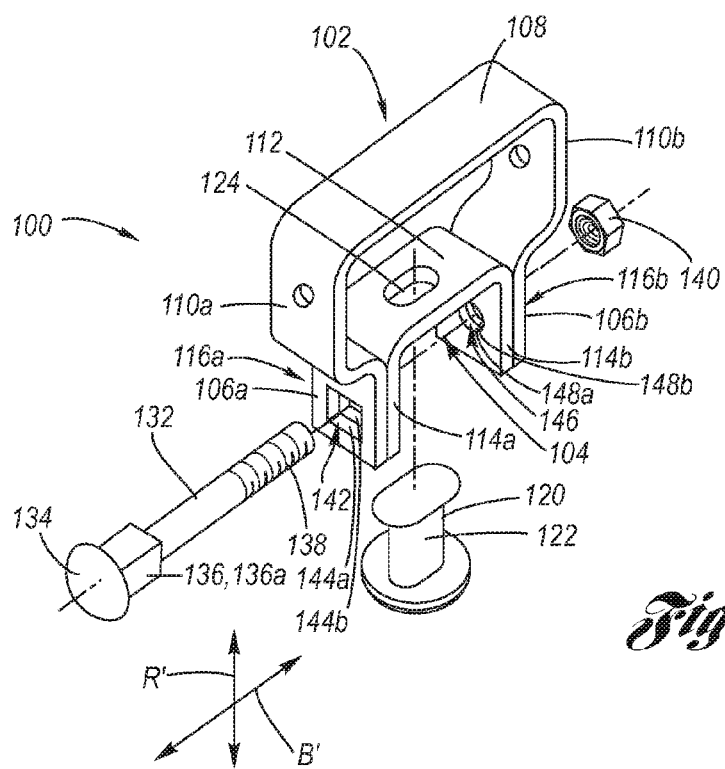
FIG. 3 is a partly exploded, perspective view of a rotationally restrained clinch clip according to a first preferred form of the present invention, wherein the liner is removed for clarity.
Figure 7:
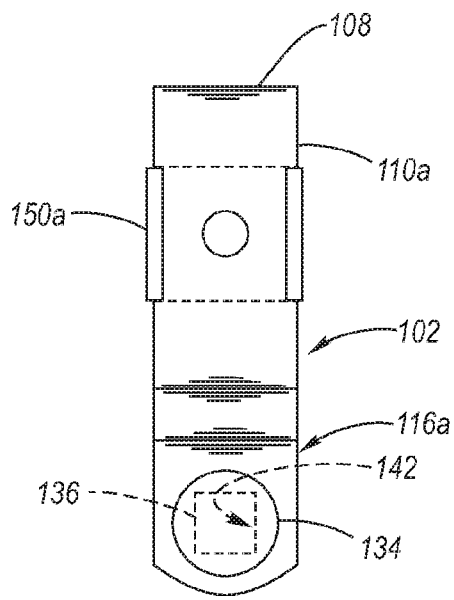
FIG. 7 is a side view, seen along line 7 of FIG. 5, wherein the leaf spring is removed for clarity.

As shown collectively by FIGS. 3, 5 and 7, at the first superposition 116a, the first leg 110a at its respective offset leg end portion 106a and its abutting second leg 114a have formed therein a mutually aligned first leg hole set 142, wherein each non-circular leg hole 144a, 144b thereof has the same non-circular cross-section which corresponds to the size and shape of the non-circular cross-section of the non-circular bolt portion 136 such that the bolt neck 136a fits therethrough but cannot relatively rotate when seated therein. At the second leg superposition 116b, the other first leg 110b at its respective offset leg end portion 106b and its abutting second leg 114b have formed therein a mutually aligned second leg hole set 146, wherein each leg hole 148a, 148b thereof is configured so that the threaded bolt portion 138 of the bolt 132 is able to pass therethrough.

The bolt 132 is placed through the first leg hole set 142 and then through the second hole set 146, wherein the non-circular bolt portion 136 is seated at both non-circular leg holes 144a, 144b of the first leg hole set 142, whereby the cooperative non-circularity of the bolt neck 136a with respect to and the non-circular leg holes 144a, 144b prevent the upper clip member 102 from rotating around the bolt axis B' with respect to the lower clip member 104 and, consequently, from rotating around the bolt axis B' with respect to the shortest leaf 12b' about the bolt axis B'. The nut 140 is threadingly engaged tightly onto the threaded bolt portion 138 of the bolt 132.

A pair of thin elastomeric liners 150a, 150b are provided at each first leg 110a, 110b facing the edges 12g' of the leaves 12L' of the leaf spring 12', as shown at FIG. 4.

In operation, the leaves 12L' of the leaf spring 12' are received into the rotationally restrained clinch clip 100, whereby the first lateral bar 108 is disposed parallel to the flat upper surface 152 of the longest leaf 12a', the rivet 130 holds tightly the second lateral bar 104 non-rotatably to the shortest leaf 12b', and wherein the first legs 110a, 110b are oriented parallel to the stacked leaf edges 12g' such that the liners 150a, 150 are separated from the leaf edges 12g' so that there is no mutual contact therebetween.

The rotationally restrained clinch clip 100 has the significant advantage that the non-circular shapes of the attachments of the rivet and the bolt prevent the rotationally restrained clinch clip from rotating around either of the rivet or bolt axes R', B', thereby eliminating noise and load path management problems associated with prior art clinch clips. An additional significant advantage of the rotationally restrained clinch clip 100 is that by providing the first legs 110a, 110b with the offset leg end portions 106a, 106b at the respective superpositions 116a, 116b, the head 134 of the bolt 132 and the threaded on nut 140 are recessed with respect to the non-offset portion of the first legs (i.e., with respect to the first legs adjacent the first lateral bar 108). In this regard as shown at FIG. 5, the offset leg end portions are configured such that the offset leg end portion 106a of first leg 110a receives therein the bolt head 134 and such that the offset leg end portion 106b of first leg 110b second leg 110b receives therein the nut 140, whereby clearance is provided for any adjacent components of the underbody of the vehicle.

Figure 8:
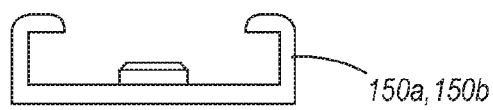
FIG. 8 is a top plan view of the liner of the rotationally restrained clinch clip according to the present invention.
Figure 9:
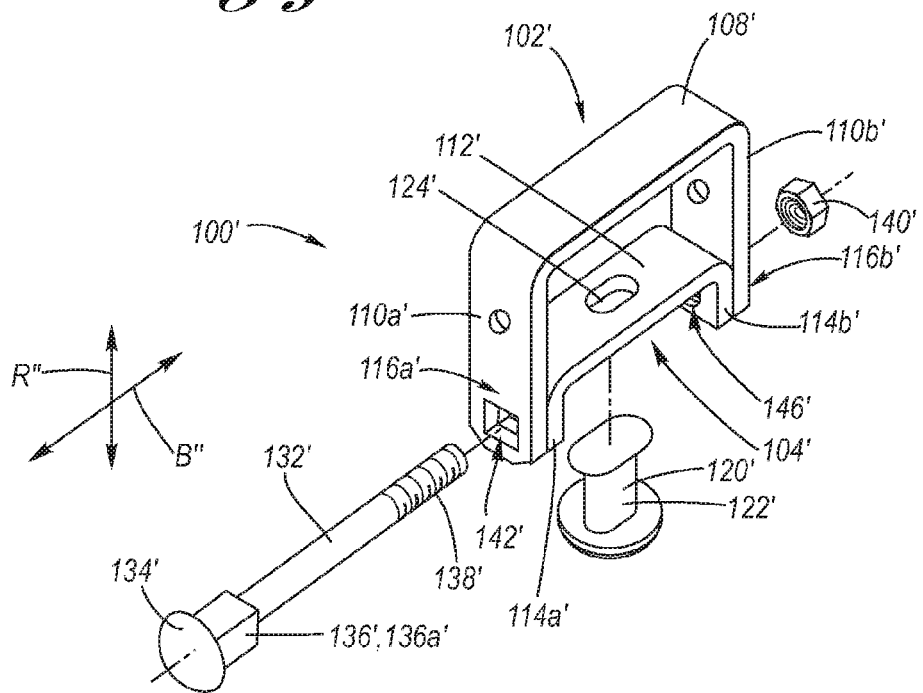
FIG. 9 is a partly exploded, perspective view of a rotationally restrained clinch clip according to a second form of the present invention, wherein the liner is removed for clarity.

Turning attention now to FIG. 8, an alternate example of the rotationally restrained clinch clip 100' is depicted, wherein like parts have like numbering to the rotationally restrained clinch clip 100 at FIG. 3, but now with a prime.

Exactly as in the rotationally restrained clinch clip 100, the non-circular shapes of the attachments of the rivet 120' and corresponding non-circular holes 124' and 126 of the shortest leaf (per FIGS. 5 and 6), and of the non-circular blot portion 136' (i.e., the bolt neck 138a') and the corresponding non-circular first hole set 142' are exactly as previously described, preventing the rotationally restrained clinch clip 100' from rotating about either of the rivet or bolt axes R", B", and thereby eliminating noise and load path management problems associated with prior art clinch clips. The change in the rotationally restrained clinch clip 100' from the rotationally restrained clinch clip 100 is that now the first legs 110a' 110b' of the upper clip member 102' are straight (there is no offset leg end portion), and the second clip member 104' has a longer second lateral bar second 112' (while being yet parallel to the first lateral bar 108'), so that the second legs 114a', 114b' abut the first legs at the first and second superpositions 116a', 116b', respectively.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A rotationally restrained clinch clip for a leaf spring, comprising:
a generally U-shaped upper clip member comprising a first lateral bar, and a pair of first legs integrally connected with said first lateral bar;
a generally U-shaped lower clip member comprising a second lateral bar, and a pair of second legs integrally connected with said second lateral bar; wherein said first and second legs abut at a first superposition and at a second superposition, and wherein said first and second superpositions are mutually spaced apart;
a rivet having a non-circularly shaped shank, wherein said second lateral bar has a non-circularly shaped hole formed therein corresponding to said shank such that said shank passes thereinto but is relatively non-rotatable with respect to said second lateral bar when seated therein;
a bolt having a non-circularly shaped bolt portion, wherein said first and second legs have a first hole set formed therein at said first superposition, wherein each hole of said first hole set is non-circularly shaped corresponding to said non-circularly shaped bolt portion, and wherein said non-circularly shaped bolt portion passes thereinto and is relatively non-rotatable with respect to each hole of said first hole set when seated therein such that said upper and lower clip members are in mutually non-rotatable relation to each other; and
an offset leg end portion of a leg of said pair of first legs at said first superposition, and an offset leg end portion of the other leg of said pair of first legs at said second superposition.

2. The clinch clip of claim 1, further comprising said bolt having a threaded portion, and a nut threadable on said threaded portion; wherein said first and second legs have a second hole set formed therein at said second superposition; and wherein said bolt extends through said first and second hole sets with said non-circular bolt portion seated at said first hole set and said nut threaded on said threaded bolt portion such that said upper and lower clip members are mutually connected in said non-rotatable relation to each other.

3. The clinch clip of claim 2, further comprising a pair of thin elastomeric liners, one liner, respectively, connected to a mutually facing side of each first leg.

4. The clinch clip of claim 2, further comprising said bolt having a bolt head adjacent said non-circular bolt portion; wherein said offset leg end portion at said first superposition is configured such that said bolt head is received therein; and wherein said offset leg end portion at said second superposition is configured such that said nut is received therein.

5. The clinch clip of claim 4, wherein said bolt is a carriage bolt having an elongated neck.

6. The clinch clip of claim 5, further comprising a pair of thin elastomeric liners, one liner, respectively, connected to a mutually facing side of each first leg.

7. A rotationally restrained clinch clip and leaf spring combination, comprising:
a generally U-shaped upper clip member comprising a first lateral bar, and a pair of first legs integrally connected with said first lateral bar;
a generally U-shaped lower clip member comprising a second lateral bar, and a pair of second legs integrally connected with said second lateral bar; wherein said first and second legs abut at a first superposition and at a second superposition, and wherein said first and second superpositions are mutually spaced apart;

a leaf of a leaf spring;

a rivet having a non-circularly shaped shank, wherein said second lateral bar has a non-circularly shaped second lateral bar hole formed therein corresponding to said shank such that said shank passes thereinto but is relatively non-rotatable with respect to said second lateral bar when seated therein; wherein said leaf has a non-circularly shaped leaf hole formed therein corresponding to said shank such that said shank passes thereinto but is relatively non-rotatable when seated therein, and wherein said rivet is seated in said second lateral bar and leaf holes such that said leaf is tightly held to said second lateral bar;

a bolt having a non-circularly shaped bolt portion, wherein said first and second legs have a first hole set formed therein at said first superposition, wherein each hole of said first hole set is non-circularly shaped corresponding to said non-circularly shaped bolt portion, and wherein said non-circularly shaped bolt portion passes thereinto and is relatively non-rotatable rotatable with respect to each hole of said first hole set when seated therein such that said upper and lower clip members are in mutually non-rotatable relation to each other; and an offset leg end portion of a leg of said pair of first legs at said first superposition, and an offset leg end portion of the other leg of said pair of first legs at said second superposition;

wherein a first rotational restraint is provided by said non-circularly shaped shank of said rivet in combination with said non-circularly shaped leaf hole and said non-circularly shaped second lateral bar hole and a second rotational restraint is further provided by said non-circularly shaped portion of said bolt in combination with said non-circularly shaped first hole set, wherein said first and second rotational restraints are orthogonal to each other.

8. The combination of claim 7, further comprising said bolt having a threaded portion, and a nut threadable on said threaded portion; wherein said first and second legs have a second hole set formed therein at said second superposition; and wherein said bolt extends through said first and second hole sets with said non-circular bolt portion seated at said first hole set and said nut threaded on said threaded bolt portion such that said upper and lower clip members are mutually connected in said non-rotatable relation to each other.

9. The combination of claim 8, further comprising a pair of thin elastomeric liners, one liner, respectively, connected to a mutually facing side of each first leg.

10. The combination of claim 8, further comprising said bolt having a bolt head adjacent said non-circular bolt portion; wherein said offset leg end portion at said first superposition is configured such that said bolt head is received therein; and wherein said offset leg end portion at said second superposition is configured such that said nut is received therein.

11. The combination of claim 10, wherein said bolt is a carriage bolt having an elongated neck.

12. The combination of claim 11, further comprising a plurality of leaves of said leaf spring disposed between said leaf and said first lateral bar; further comprising a pair of thin elastomeric liners, one liner, respectively, connected to a mutually facing side of each first leg, each liner being spaced from said plurality of leaves.

* * * * *